(12) United States Patent
Naick et al.

(10) Patent No.: US 7,484,780 B2
(45) Date of Patent: Feb. 3, 2009

(54) BUMPER BEAM FOR AUTOMOBILE

(75) Inventors: Pratap Atchutha Naick, Lake Orion, MI (US); Madhu Koka, Rochester, MI (US); Ronald Scott Kemp, Oxford, MI (US); Gregory A. Beecher, Madison Heights, MI (US)

(73) Assignee: Chrysler LLC, Auburn Hills, MI (US)

( * ) Notice: Subject to any disclaimer, the term of this patent is extended or adjusted under 35 U.S.C. 154(b) by 379 days.

(21) Appl. No.: 11/403,056

(22) Filed: Apr. 12, 2006

(65) Prior Publication Data

US 2007/0252397 A1 Nov. 1, 2007

(51) Int. Cl.
*B60R 19/02* (2006.01)
(52) U.S. Cl. .................................................... 293/120
(58) Field of Classification Search ................ 293/102, 293/120, 132, 133; 296/187.03, 187.09
See application file for complete search history.

(56) References Cited

U.S. PATENT DOCUMENTS

| | | | |
|---|---|---|---|
| 4,671,550 A | 6/1987 | Molnar | |
| 6,406,081 B1 * | 6/2002 | Mahfet et al. | 293/133 |
| 6,412,836 B1 * | 7/2002 | Mansoor et al. | 293/132 |
| 6,474,708 B1 * | 11/2002 | Gehringhoff et al. | 293/120 |
| 6,609,740 B2 | 8/2003 | Evans | |
| 7,163,242 B2 * | 1/2007 | Shuler et al. | 293/120 |
| 7,188,876 B2 * | 3/2007 | Jaarda et al. | 293/133 |
| 2002/0149214 A1 * | 10/2002 | Evans | 293/120 |
| 2003/0080573 A1 * | 5/2003 | Marijnissen et al. | 293/132 |
| 2004/0094977 A1 * | 5/2004 | Shuler et al. | 293/133 |
| 2004/0119301 A1 | 6/2004 | Evans | |
| 2004/0130167 A1 | 7/2004 | Mori et al. | |
| 2004/0174024 A1 | 9/2004 | Murata et al. | |
| 2004/0256867 A1 | 12/2004 | Evans et al. | |
| 2005/0046206 A1 | 3/2005 | Ohno et al. | |
| 2006/0028032 A1 * | 2/2006 | Henseleit | 293/102 |

\* cited by examiner

*Primary Examiner*—H Gutman
(74) *Attorney, Agent, or Firm*—Ralph E. Smith

(57) ABSTRACT

A bumper beam for an automobile is disclosed, which has a first set of surfaces and a second set of surfaces. The first set of surfaces is inclined at a pre-defined angle with respect to a pre-defined plane. A plurality of slots is provided on the second set of surfaces of the bumper beam, which facilitates the bumper beam to crush during an impact.

16 Claims, 3 Drawing Sheets

BUMPER BEAM FOR AUTOMOBILE

FIELD OF THE INVENTION

The present invention generally relates to automobiles. More particularly, it relates to a bumper beam for an automobile.

BACKGROUND OF THE INVENTION

Bumpers are attached to the front and the rear ends of automobiles such as cars, trucks and vans. They reduce damage to the automobile, specifically to the engine and the fuel tank, in the event of a front or rear collision. They can be made of a material such as plastic, acrylic and steel and improve the visual appearance of the automobile. The bumper envelops a bumper beam, which is connected to the rails of the chassis that supports various components such as the engine and body of the automobile. The bumper beam can absorb the force generated due to an impact on the bumper, such as during a front or rear collision, by deforming and buckling. This is referred to as crush-space utilization. Better crush-space utilization in the bumper beam reduces the amount of force transmitted to the engine, the fuel tank, and other components, and thereby protects them from damage. However, the bumper beam may buckle in an undesirable manner, causing inadequate deformation, and therefore absorbing only a fraction of the force that it is capable of absorbing. Hence, a large amount of force can be transmitted to the components, damaging them severely. In the event of a rear collision, a damaged fuel tank and fuel leakage can cause fire and, therefore, can be fatal for the occupants of the automobile.

There are various bumper beams that enable absorption of the force generated due to an impact or collision. In one such bumper beam, there are box-shaped sections that can absorb the force generated due to the impact. In another bumper beam, made of a lightweight and flexible material, a force of minor magnitude, generated due to the impact, can be absorbed.

However, existing bumper beams suffer from one or more of the following limitations. They have complicated designs and are difficult to assemble. Further, due to their complicated designs, their assembly requires various parts to be welded together. In addition, they are expensive since they are made of special materials. Moreover, they are not capable of withstanding high-magnitude forces generated due to an impact.

In the light of the foregoing discussion, there is a need for a bumper beam that will allow a greater degree of deformation, i.e., better crush space utilization, thereby absorbing a greater amount of force to protect the automobile and its occupants during an impact. The bumper beam should also buckle in a desirable manner, so as to absorb the maximum amount of the force generated. Further, it should be simple in design and easy to assemble. Also the bumper beam should also be made of cheap conventional materials rather than special expensive materials.

SUMMARY OF THE INVENTION

An object of the present invention is to provide a bumper beam with a higher capacity of force absorption by allowing a greater degree of deformation, i.e., better crush-space utilization.

Another object of the present invention is to provide a bumper beam that buckles in a desirable manner, thereby absorbing the maximum amount of force while buckling.

Yet another object of the present invention is to provide a bumper beam for an automobile, which is simpler in design and easier to assemble.

Yet another object of the present invention is to provide a bumper beam that is made of cheap conventional materials rather than special expensive materials.

The present invention provides a bumper beam for an automobile. The bumper beam has a first set of surfaces and a second set of surfaces. The first set of surfaces is inclined at a pre-defined angle with respect to a pre-defined plane. The pre-defined angle ensures that the first set of surfaces buckle outward during an impact on the bumper beam. The second set of surfaces has a plurality of slots, which facilitates the bumper beam to crush during an impact.

The present invention also provides a safety system, which has a B-section bumper beam and one or more rails. The B-section bumper beam includes a first set of surfaces and a second set of surfaces. The first set of surfaces is inclined at a pre-defined angle with respect to a pre-defined plane. The pre-defined angle ensures that the first set of surfaces buckle outward during an impact on the B-section bumper beam. The second set of surfaces has a plurality of slots which facilitates the B-section bumper beam to crush during the impact. The B-section bumper beam is connected to the one or more rails, which absorb the force generated due to the impact on the B-section bumper beam.

BRIEF DESCRIPTION OF THE DRAWINGS

The various embodiments of the invention will hereinafter be described in conjunction with the appended drawings, provided to illustrate and not to limit the invention, wherein like designations denote like elements, and in which.

DETAILED DESCRIPTION OF THE PREFERRED EMBODIMENTS

The present invention describes a bumper beam for an automobile. The bumper beam has a first set of surfaces and a second set of surfaces. The first set of surfaces is inclined at a pre-defined angle with respect to a pre-defined plane. The pre-defined angle ensures that the first set of surfaces buckle outward during an impact on the bumper beam. A plurality of slots is provided on the second set of surfaces that facilitate the bumper beam to crush during the impact on it.

The present invention also describes a safety system for an automobile. This safety system has a B-section bumper beam and one or more rails. The B-section bumper beam includes a first set of surfaces and a second set of surfaces. The first set of surfaces is inclined at a pre-defined angle with respect to a pre-defined plane. The pre-defined angle can lie in a range between 1 degree and 3 degrees. The pre-defined angle ensures that the first set of surfaces buckle outward during an impact on the B-section bumper beam. The second set of surfaces has a plurality of slots that facilitates the B-section bumper beam to crush during the impact on it. The B-section bumper beam is connected to the one or more rails, which absorb the impact on the B-section bumper beam.

Figure 1:
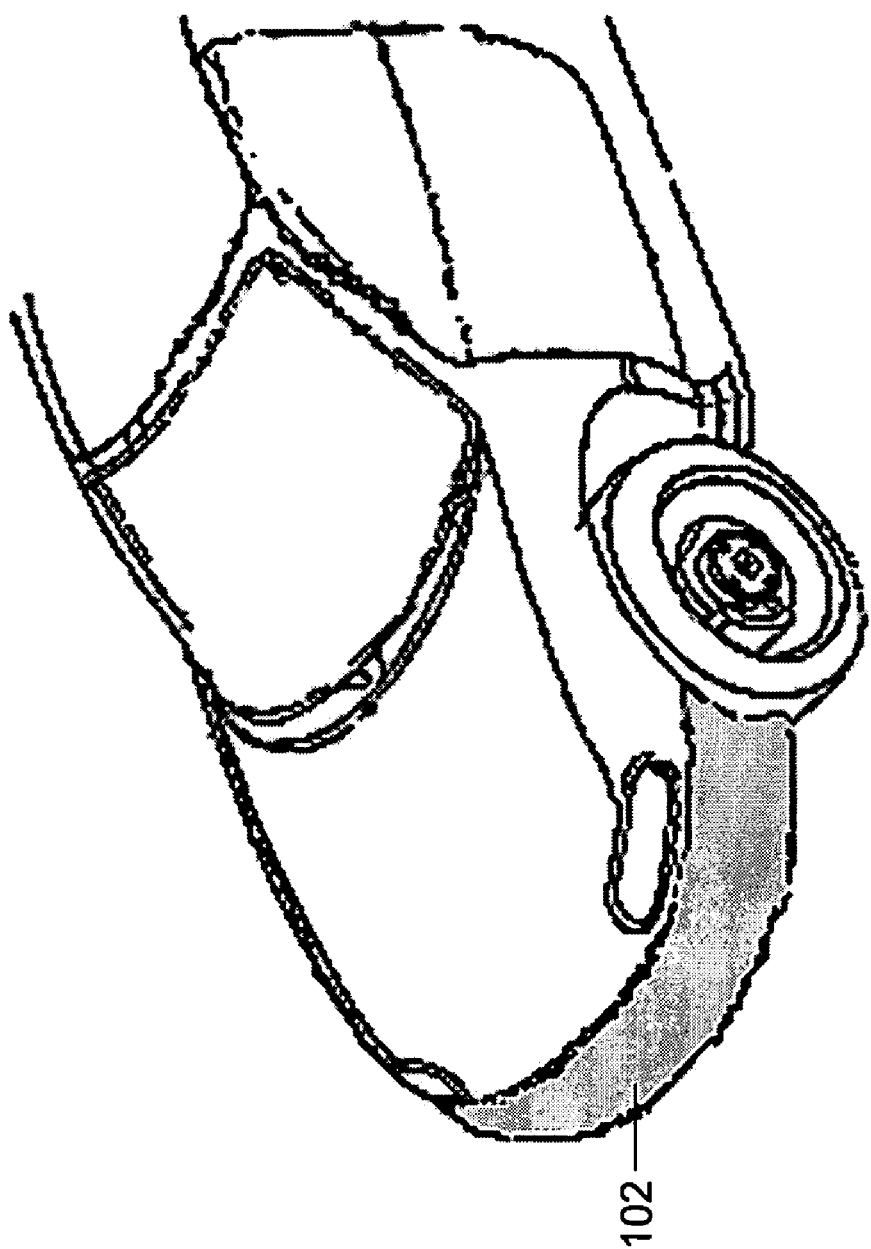
FIG. 1 illustrates an automobile, where various embodiments of the present invention may be practiced.

FIG. 1 illustrates an automobile 100, where the various embodiments of the present invention may be practiced. Automobile 100, such as cars, trucks and vans, has a bumper 102. FIG. 1 shows a bumper 102 attached to the front end of the automobile 100, although it is obvious to a person ordinarily skilled in the art that a bumper 102 can be attached to the rear end of the automobile 100 as well. Bumper 102 envelops a bumper beam (not visible in FIG. 1), which acts as a damper in an event of a front or rear impact on automobile 100, by partially or completely absorbing the force generated due to the impact. Bumper 102 can be made of materials such as plastic, acrylic, steel, and so forth.

Figure 2:
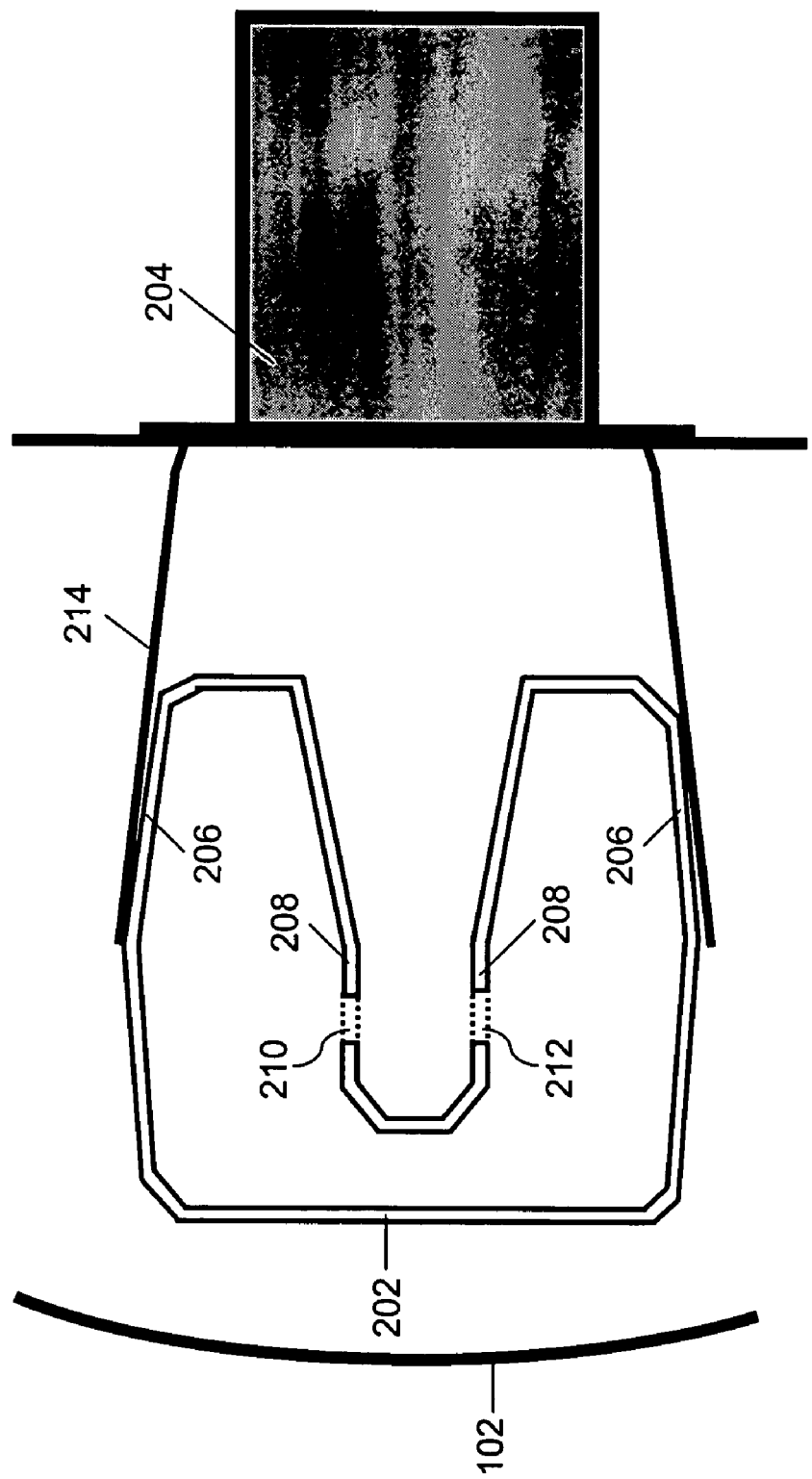
FIG. 2 illustrates a cross-sectional view of a safety system for an automobile, in accordance with an embodiment of the present invention.

FIG. 2 illustrates a cross-sectional view of a safety system 200 for automobile 100, in accordance with an embodiment of the present invention. Safety system 200 includes a B-section bumper beam 202 and a rail 204 connected to it. B-section bumper beam 202 has a first set of surfaces 206 and a second set of surfaces 208. Although safety system 200 is shown to include a B-section bumper beam, it is obvious to a person ordinarily skilled in the art that the bumper beam can be of any other shape. First set of surfaces 206 is inclined at a pre-defined angle with respect to a pre-defined plane such as a ground plane. In an embodiment of the present invention, the pre-defined angle may lie in a range of between 1 degree and 3 degrees. For example, the pre-defined angle can be a 2 degree angle. The pre-defined angle ensures that first set of surfaces 206 buckle outward during an impact on B-section bumper beam 202, thereby achieving the deformation in a desired manner. Second set of surfaces 208 of B-section bumper beam 202 has a slot 210 and a slot 212 located in front of rail 204. Slot 210 and slot 212 ensure a higher degree of deformation of B-section bumper beam 202 during an impact, as compared to conventional bumper beams, thereby improving the crush-space utilization. In FIG. 2, the B-section bumper beam is shown to have slot 210 and slot 212, although it is obvious to a person ordinarily skilled in the art that the B-section bumper beam can have more or less slots as well. The higher degree of deformation is ensured due to the reduced stiffness of B-section bumper beam 202 in front of rail 204, caused by the presence of slot 210 and slot 212. The dimensions of slot 210 and slot 212 depend on parameters such as the dimensions of rail 204, crush-space utilization, and the crushability of B-section bumper beam 202. For example, as the width of rail 204 increases, the lengths of slot 210 and slot 212 also increase to achieve the higher degree of deformation. In another example, the widths of slot 210 and slot 212 can depend on the amount of force to be absorbed during an impact on B-section bumper beam 202.

B-section bumper beam 202 is connected to rail 204 through a crush can 214, which can be connected by bolts, rivets, screws, structural adhesives or may be welded to B-section bumper beam 202 and rail 204.

Figure 3:
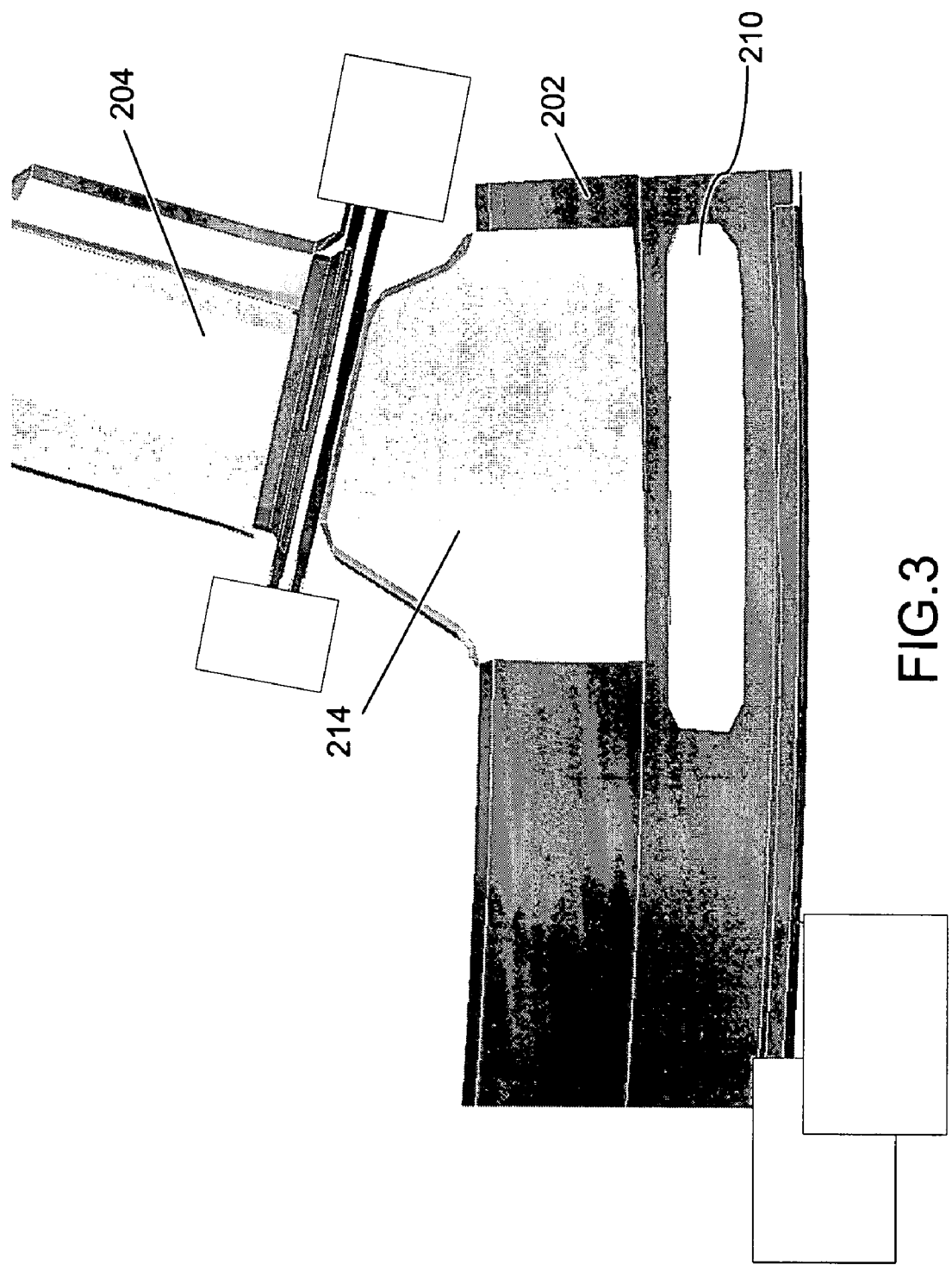
FIG. 3 illustrates a top view of a B-section bumper beam for an automobile, in accordance with an embodiment of the present invention.

FIG. 3 illustrates a top-view of B-section bumper beam 202 of automobile 100, in accordance with an embodiment of the present invention. B-section bumper beam 202 is connected to rail 204 through crush can 214. Crush can 214 ensures that B-section bumper beam 202 is held in place, and also ensures that the force that is not absorbed by B-section bumper beam 202 is transmitted to rail 204. B-section bumper beam 202 has slot 210 and slot 212 (not shown in figure FIG. 3) in front of rail 204. Slot 210 and slot 212 improve the crush-space utilization by ensuring a higher degree of deformation of B-section bumper beam 202 during an impact.

An advantage of the bumper beam mentioned above is that it has a higher capacity to absorb force generated due to an impact by enabling greater degree of deformation, and therefore, better crush-space utilization. The bumper beam also buckles in a desirable manner, so as to absorb the maximum amount of the force. It can also absorb impacts of higher magnitude, and is simpler in design and easier to assemble. Further, it is free of distortions caused due to heat. Moreover, it is made of conventional cheap materials rather than from expensive ones.

While the various embodiments of the invention have been illustrated and described, it will be clear that the invention is not limited only to these embodiments. Numerous modifications, changes, variations, substitutions, and equivalents will be apparent to those skilled in the art, without departing from the spirit and scope of the invention, as described in the claims.

What is claimed is:

1. A bumper beam for an automobile having a plurality of automobile frame rails, the bumper beam comprising:

an elongate beam body of B-shaped lateral cross-section defining a forward face and a rearward face, the rearward face being adapted to be supported by the rails at a plurality of mounting locations on the beam body, the rearward face including in lateral cross-section an upper deformable projection and a lower deformable projection, each of the upper and lower projections having an inner surface opposite the other projection, an outer surface, and a ridge bridging between the inner and outer surfaces, wherein a portion of the outer surface of each projection is inclined at a pre-defined angle with respect to a reference plane when the beam body is viewed in lateral cross-section such that the portion of the outer surface of each projection diverges outwardly on the beam body with increasing distance from the ridge of each projection, and wherein the inner surface of each projection includes a plurality of slots, the slots being positioned proximate to the mounting locations such that the slots are vertically aligned in front of the rails when the beam body is supported by the rails.

2. The bumper beam of claim 1, wherein the pre-defined angle lies in a range of one degree to three degrees.

3. The bumper beam of claim 2, wherein the pre-defined angle is a two degree angle.

4. The bumper beam of claim 1, wherein at least one mounting location on the bumper beam is defined by a crush can attached to the inclined portion of the outer surface of each projection.

5. The bumper beam of claim 4, wherein one of the slots on the inner surface of each projection is disposed in front of the crush can.

6. The bumper beam of claim 5, wherein the crush can has a width dimension proximate to the inclined portion of the outer surface of each projection, and wherein the one slot on the inner surface of each projection disposed in front of the crush can has a length greater than the width dimension of the crush can.

7. The bumper beam of claim 1, wherein the outer surface and the ridge of each projection are continuous surfaces.

8. The bumper beam of claim 1, wherein the rails have a width dimension proximate to the mounting locations on the beam body, and wherein the slots have a length greater than the width dimension of the rails.

9. A safety system for an automobile having a plurality of automobile frame rails, the safety system comprising:

an elongate beam body of B-shaped lateral cross-section defining a forward face and a rearward face, the rearward face being adapted to be supported by the rails at a plurality of mounting locations on the beam body, the rearward face having an upper deformable projection and a lower deformable projection, each of the upper and lower projections having an inner surface opposite the other projection, an outer surface, and a ridge bridging the inner and outer surfaces, wherein the outer surface and the ridge of each projection are continuous, and wherein the inner surface of each projection includes a plurality of elongate slots, the slots being positioned proximate to the mounting locations to thereby define a pair of vertically-aligned slots in front of each rail when the beam body is supported by the rails.

10. The safety system of claim 9, further comprising a crush can connecting each rail to a respective mounting location on the beam body.

11. The safety system of claim 10, wherein the slots on the inner surface of each projection are only disposed in front of the crush cans when the bumper body is supported by the rails.

12. The safety system of claim 11, wherein the crush cans have a width dimension proximate to the mounting locations on the beam body, and wherein the slots have a length greater than the width dimension of the crush cans.

13. The safety system of claim 9, wherein a portion of the outer surface of each projection is inclined at a pre-defined angle with respect to a reference plane when the beam body is viewed in lateral cross-section such that the portion of the outer surface of each projection diverges outwardly on the beam body with increasing distance from the ridge of each projection.

14. The safety system of claim 13, wherein the pre-defined angle lies in a range of one degree to three degrees.

15. The safety system of claim 14, wherein the pre-defined angle is at least a two degree angle.

16. The safety system of claim 9, wherein the rails have a width dimension proximate to the mounting locations on the beam body, and wherein the slots have a length greater than the width dimension of the rails.

* * * * *